United States Patent
Sartorius et al.

(10) Patent No.: US 7,330,941 B2
(45) Date of Patent: Feb. 12, 2008

(54) GLOBAL MODIFIED INDICATOR TO REDUCE POWER CONSUMPTION ON CACHE MISS

(75) Inventors: Thomas Andrew Sartorius, Raleigh, NC (US); Victor Roberts Augsburg, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 11/088,383

(22) Filed: Mar. 23, 2005

(65) Prior Publication Data

US 2006/0218354 A1   Sep. 28, 2006

(51) Int. Cl.
*G06F 12/00* (2006.01)
(52) U.S. Cl. .................................................. 711/143
(58) Field of Classification Search ................ 711/133, 711/135, 144, 145, 143
See application file for complete search history.

(56) References Cited

U.S. PATENT DOCUMENTS

| 5,247,643 | A | 9/1993 | Shottan |
| 5,555,398 | A * | 9/1996 | Raman ...................... 711/143 |
| 5,692,150 | A | 11/1997 | Moriyama et al. |
| 2003/0018856 | A1 | 1/2003 | Rowlands |
| 2006/0143397 | A1 * | 6/2006 | O'Bleness et al. .......... 711/135 |

* cited by examiner

*Primary Examiner*—Hiep T. Nguyen
(74) *Attorney, Agent, or Firm*—Thomas Rouse; Nicholas J. Pauley; Joseph B. Agusta

(57) ABSTRACT

A processor includes a cache memory having at least one entry managed according to a copy-back algorithm. A global modified indicator (GMI) indicates whether any copy-back entry in the cache contains modified data. On a cache miss, if the GMI indicates that no copy-back entry in the cache contains modified data, data fetched from memory are written to the selected entry without first reading the entry. In a banked cache, two or more bank-GMIs may be associated with two or more banks. In an n-way set associative cache, n set-GMIs may be associated with the n sets. Suppressing the read to determine if the copy-back cache entry contains modified data improves processor performance and reduces power consumption.

10 Claims, 2 Drawing Sheets

GLOBAL MODIFIED INDICATOR TO REDUCE POWER CONSUMPTION ON CACHE MISS

BACKGROUND

The present invention relates generally to the field of processors and in particular to a method of reducing power consumption in a copy-back data cache by inspection of a global modified indicator.

Microprocessors perform computational tasks in a wide variety of applications, including embedded applications such as portable electronic devices. The ever-increasing feature set and enhanced functionality of such devices requires ever more computationally powerful processors, to provide additional functionality via software. Another trend of portable electronic devices is an ever-shrinking form factor. An impact of this trend is the decreasing size of batteries used to power the processor and other electronics in the device, making power efficiency a major design goal. Hence, processor improvements that increase execution speed and reduce power consumption are desirable for portable electronic device processors.

Many programs are written as if the computer executing them had a very large (ideally, unlimited) amount of fast memory. Most modern processors simulate that ideal condition by employing a hierarchy of memory types, each having different speed and cost characteristics. The memory types in the hierarchy commonly vary from very fast and very expensive at the top, to progressively slower but more economical storage types in lower levels. Due to the spatial and temporal locality characteristics of most programs, the instructions and data executing at any given time are statistically likely to be needed in the very near future, and may be advantageously retained in the upper, high-speed hierarchical layers, where they are readily available. As code progresses and/or branches to new areas, the necessary instructions and data may be loaded from the lower memory hierarchy levels into the upper levels. While this movement of instructions and data between memory hierarchy levels incurs some performance degradation and may require complex hardware and software management, the overall result is a net increase in memory performance over using only the slow memory types, with considerable cost savings as compared to using only the fast memory types.

A representative processor memory hierarchy may comprise an array of General Purpose Registers (GPRs) in the processor core as the top level. These are the fastest memory—in many cases employing both edges of the clock, and hence able to both write and read data in a single cycle. Constructed from gates on the processor die, GPRs are expensive in terms of silicon area, power consumption and the overhead they impose in terms of routing, clock distribution and the like.

Processor registers may be backed by one or more on-chip cache memories, which comprise the primary instruction and data storage structures for active code; for example, hit rates in many instruction caches may reach 97-98%. On-chip caches (also known in the art as Level-1 or L1 caches) are expensive for the same reasons discussed above with respect to GPRs. However, caches may be implemented as DRAM structures, achieving a much higher density and hence lower cost per bit than GPRs. Separate caches may be dedicated to storing instructions and data, and the data caches may be managed according to a variety of strategies, as discussed further herein.

Depending on the implementation, a processor may include one or more off-chip, or L2 caches. L2 caches are often implemented in SRAM for fast access times, and to avoid the performance-degrading refresh requirements of DRAM. Below all the caches is main memory, usually implemented in DRAM for maximum density and hence lowest cost per bit. The main memory may be backed by hard disk storage, which is generally implemented on magnetic media accessed via mechanically actuated sensors, and hence extremely slow compared to the electronic access of higher levels of the memory hierarchy. The disks may further be backed by tape or CD, comprising magnetic or optical media, respectively. Most portable electronic devices have limited, if any, disk storage and no tape/CD backup, and hence main memory (often limited in size) is the lowest level of the memory hierarchy.

In a computer memory hierarchy, each lower level maintains a full (but possibly stale) copy of the data resident in higher layers. That is, the data stored in higher levels replicates that in the lower levels. Changes to data stored in the upper levels of the memory hierarchy must be propagated down to the lower levels. Changes to the GPRs are expressly propagated to caches by STORE instructions; changes to the caches are automatically propagated to main memory under the direction of a cache controller.

In general, two approaches have developed in the art to propagating modifications to the data in a cache to main memory: write-through and copy-back. In a write-through cache, when a processor writes modified data to its L1 cache, it additionally writes the modified data to main memory (any intervening caches are omitted for the purpose of this discussion). In a write-through cache, the main memory always contains the most recent version of the data; hence data stored in a cache entry may be discarded at any time, without special processing. As discussed below, this simplifies cache management.

Under a copy-back algorithm, a processor may write modified data to an L1 cache, but is not required to immediately update main memory. The cache entry then contains data that is different from the version in main memory, often referred to as a "dirty" entry. The cache entry is marked to reflect this, such as by setting a "dirty bit." The modified data is written to main memory at a later time, such as when the cache entry is replaced in processing a cache miss, or under software control. Copy-back cache management may improve performance when a processor performs many data writes, because writing to the cache generally incurs a much shorter latency than writing to main memory. The copy-back algorithm also reduces bus traffic to main memory, which may reduce power consumption. The two cache management algorithms are not mutually exclusive; a single cache may manage some entries under a write-through algorithm, and may manage others using a copy-back algorithm.

Because the cache size is limited compared to main memory, the cache is "shared" by the entire memory, on a temporal basis. That is, data from different areas of main memory may occupy the same cache entry at different times. If a memory access "misses" in the cache, the data are retrieved from main memory and stored in the cache. Once the cache fills with data during use, a cache miss that retrieves data from memory must displace a currently occupied entry in the cache. A cache entry managed under a write-through algorithm may be replaced without any special processing.

A cache entry managed under a copy-back algorithm, however, must be checked to see if the data are dirty prior to replacement. The cache line must be read, and the dirty bit inspected. If the existing data in the selected cache entry are dirty (that is, different from the version in main memory), they must be written to main memory prior to replacing the cache entry with the new data read from memory. In most implementations, the processor is not aware of the cache management algorithm of existing cache entries. Hence, if any entry in the cache is (or may be) managed under a copy-back algorithm, every entry must be read upon replacement to ascertain whether the entry is copy-back, and if so, whether it is dirty (both of which inquiries may collapse to simply inspection of the dirty bit). Reading every cache entry for dirty bit inspection upon replacement of the entry consumes power, and is superfluous when it is known that no cache entry has been modified.

SUMMARY

According to one or more embodiments of the present invention, the reading of a cache entry selected for replacement when processing a cache miss, in a cache that supports copy-back management for at least one entry, is suppressed in response to an indication that no copy-back cache entry in the cache has been written.

One embodiment comprises a method of managing a cache including at least one entry managed according to a copy-back algorithm. A global modified indicator associated with the cache is updated upon a write to any copy-back cache entry. The global modified indicator is inspected upon a miss. If the global modified indicator indicates that no copy-back entry in the cache contains modified data, a cache entry selected for replacement is updated with new data without first reading the entry.

Another embodiment comprises a processor including a cache memory having at least one entry managed according to a copy-back algorithm and a global modified indicator, indicating whether any copy-back entry in the cache has been written. The processor also includes a cache controller operative to replace an entry in the cache without first reading the entry, if the global modified indicator indicates that no copy-back cache entry contains modified data.

Yet another embodiment comprises a method of processing a cache miss in a cache including at least one entry managed according to a copy-back algorithm. A miss in the cache is detected and the requested data is read from memory. If a global modified indicator indicates that no copy-back cache entry contains modified data, the data read from memory is written to the selected entry without reading the contents of the entry.

DETAILED DESCRIPTION

Figure 1:
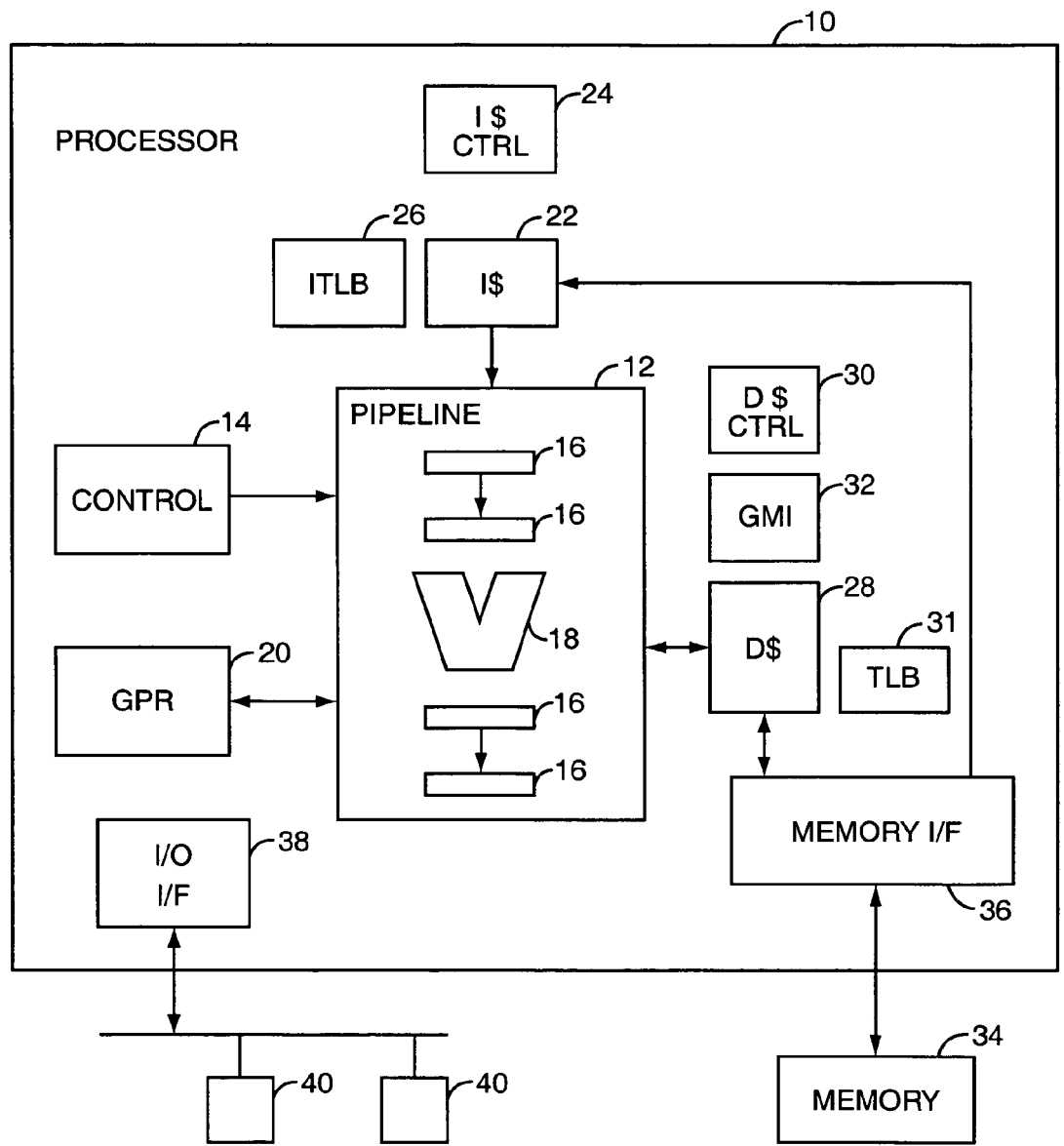
FIG. 1 is a functional block diagram of a processor.

FIG. 1 depicts a functional block diagram of a processor 10. The processor 10 executes instructions in an instruction execution pipeline 12 according to control logic 14. In some embodiments, the pipeline 12 may be a superscalar design, with multiple parallel pipelines. The pipeline 12 includes various registers or latches 16, organized in pipe stages, and one or more Arithmetic Logic Units (ALU) 18. A General Purpose Register (GPR) file 20 provides registers comprising the top of the memory hierarchy.

The pipeline 12 fetches instructions from an instruction cache (I-cache or I$) 22, controlled by an I-cache controller 24. Memory address translation and permissions for instructions are managed by an Instruction-side Translation Lookaside Buffer (ITLB) 26. Data is accessed from a data cache (D-cache or D$) 28, controlled by a D-cache controller 30. Associated with the D-Cache is a Global Modified Indicator (GMI) 32. As discussed below, the GMI is set whenever a copy-back cache entry is written in the D-cache 28, and may be cleared by software, such as following a software cleaning of the cache, as discussed below. Memory address translation and permissions for data are managed by a main Translation Lookaside Buffer (TLB) 31. In various embodiments, the ITLB 26 may comprise a copy of part of the TLB 31. Alternatively, the ITLB 26 and TLB 31 may be integrated. Similarly, in various embodiments of the processor 10, the I-cache 22 and D-cache 28 may be integrated, or unified. Misses in the I-cache 22 and/or the D-cache 28 cause an access to main (off-chip) memory 34, under the control of a memory interface 36.

The processor 10 may include an Input/Output (I/O) interface 38, controlling access to various peripheral devices 40. Those of skill in the art will recognize that numerous variations of the processor 10 are possible. For example, the processor 10 may include a second-level (L2) cache for either or both the I- and D-caches 22, 28. In addition, one or more of the functional blocks depicted in the processor 10 may be omitted from a particular embodiment.

As described above, whenever a data access misses in the D-cache 28, the requested data is retrieved from main memory 34, and placed in the D-cache 28. If the D-cache 28 is full (or even if it is not, under some replacement algorithms), the new data will displace an existing entry in the D-cache 28. If all cache entries are managed according to a write-through algorithm, the data may simply be written to the cache, and the previous data stored at that location is overwritten. There is no danger of destroying modifications made to the data in this case, because if the processor had previously stored data in that cache entry, it was immediately "written-through" to main memory 34 at that time.

If the cache supports a copy-back algorithm for at least one cache entry, however, the processor 10 must first read out the existing cache line to determine if the data is "dirty," or has previously been written without a concomitant update of the main memory 34. Prior art processors simply perform this read every time a cache entry is replaced. However, if it is known that no copy-back entry in the D-cache 28 has been written, the line may be replaced without performing the read to check for a dirty bit. This improves processor performance and reduces power consumption.

Figure 2:
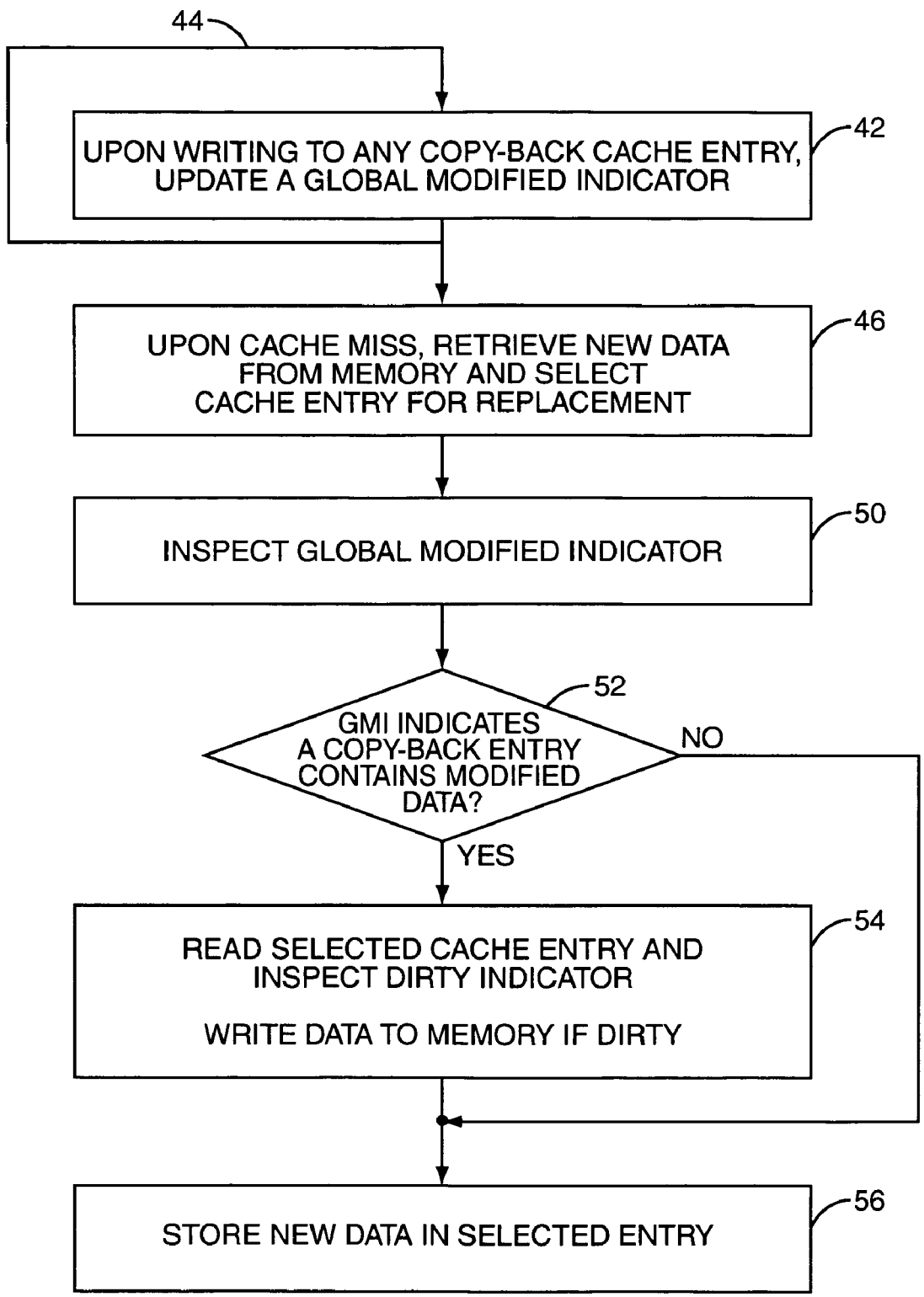
FIG. 2 is a flow diagram of a method of processing a cache miss.

FIG. 2 depicts a method of cache management according to one or more embodiments of the present invention. Whenever the processor 10 writes data to any copy-back entry in the cache 28, a Global Modified Indicator (GMI) 32 is altered to reflect this fact (block 42). In the simplest case, the GMI 32 may comprise a single bit. The processor 10 may be aware of the cache entry's management algorithm (write-through or copy-back) by accessing page attributes in a TLB lookup (such as when translating a virtual to physical address). Alternatively, the entire cache, or certain address ranges, may be "fixed" to operate in one or the other mode, either hardwired or via configuration bits. In one embodiment, the GMI 32 is set only upon a write to a copy-back cache entry; a write to a write-through cache entry does not set the GMI 32. Setting the GMI 32 upon writing a copy-back cache entry is an ongoing process (as indicated by the loop-back arrow 44).

On a cache miss, data are retrieved from main memory 34, and a cache entry is selected to store the new data (block 46). The GMI 32 is then inspected (block 50). If the GMI 32 indicates that a copy-back entry has previously been written (block 52), e.g. in the case of a single-bit GMI 32, if the bit is set, then the cache entry is replaced according to the prior art method of first reading the line to see if it is dirty, and if so, updating main memory (block 54). However, if the GMI 32 indicates that no copy-back entry in the cache 28 has been written, the processor avoids the step of reading the cache entry, and directly replaces it by writing the new data retrieved from memory to the selected cache entry (block 56). This eliminates the power consumption and additional latency of reading the cache entry to inspect the dirty bit.

The GMI 32 may be cleared, or reset to a condition indicating that no copy-back cache entry has been written, by software (in addition to a system reset). This may occur, for example, following a software "cleaning" operation, where the software cycles through the cache 28, writing data from all dirty, copy-back entries to main memory 34. Note that with a single GMI 32 associated with the entire cache 28, the power conservation and processor performance described herein is only available from the time the GMI 32 is reset, up until data is written to a copy-back cache entry. Once any copy-back entry is written, all copy-back entries must be read prior to replacement to check if they are dirty, until software again cleans the cache and resets the GMI 32.

As well known in the art, caches 22, 28 may be physically and logically structured in a variety of ways. One known cache organization is n-way set associativity, wherein part of the (virtual or physical) address field, called an index, is used to select one of n sets of cache entries to which data may be mapped. According to one embodiment, each set in the cache 28 may have a set-GMI 32 associated with it, indicating whether a copy-back entry within that set has previously been written. This allows the processor 10 to continue to reap the performance and power benefits for n–1 sets in the cache 28, after a copy-back entry is written in one set.

Another known cache organization is to divide a cache 28 into two or more banks. The banks are selected by a bank-select field of the (virtual or physical) address. According to one embodiment, each bank of the cache 28 may have a bank-GMI 32 associated with it, indicating whether a copy-back entry within that bank has previously been written. This allows the processor 10 to continue to reap the performance and power benefits for one or more banks, when a copy-back entry is written in another bank.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of managing a cache including at least one entry managed according to a copy-back algorithm, comprising:

updating a global modified bit associated with the cache upon a write to any copy-back cache entry;

upon processing a miss, inspecting the global modified bit; and if the global modified bit indicates that no copy-back entry in the cache contains modified data, writing new data to the selected cache entry without first reading the entry to determine whether it contains modified data.

2. The method of claim 1 wherein the cache is divided into two or more banks, a bank-global modified bit is associated with each bank, and a selected cache entry is replaced without being read when the associated bank-global modified bit indicates that no copy-back entry in the bank has been written.

3. The method of claim 1 wherein the cache is an n-way set associative cache, a set-global modified bit is associated with each set, and a selected cache entry is replaced without being read when the associated set-global modified bit indicates that no copy-back entry in the set has been written.

4. The method of claim 1 wherein the global modified bit may be reset by software.

5. The method of claim 4, wherein software resets the global modified bit following cleaning the cache by writing all copy-back entries containing modified data to memory.

6. A processor, comprising:

a cache memory including at least one entry managed according to a copy-back replacement algorithm;

a global modified bit, indicating whether any copy-back entry in the cache contains modified data; and a cache controller operative to replace an entry in the cache without first reading the entry, if the global modified bit indicates that no copy-back cache entry contains modified data.

7. The processor of claim 6 wherein the cache is divided into two or more banks, and further comprising two or more bank-global modified bit, each indicating whether any copy-back entry in an associated bank contains modified data, and wherein the controller is operative to replace a cache entry in a bank without first reading the entry, if the associated bank-global modified bit indicates that no copy-back cache entry in the bank contains modified data.

8. The method of claim 7 wherein the cache is an n-way set associative cache, and further comprising two or more set-global modified bits, each indicating whether any copy-back entry in an associated cache set contains modified data, and wherein the controller is operative to replace a cache entry in a set without first reading the entry, if the associated set-global modified bit indicates that no copy-back cache entry in the set contains modified data.

9. The method of claim 7 wherein the global modified bit is operative to be reset by software.

10. A method of processing a cache miss in a cache including at least one entry managed according to a copy-back replacement algorithm, comprising:

detecting a miss in the cache;

reading the requested data from memory; and if a global modified bit indicates that no copy-back cache entry in the cache has been written, writing the data read from memory to the selected entry without reading the contents of the entry.

* * * * *